Patented Nov. 3, 1953

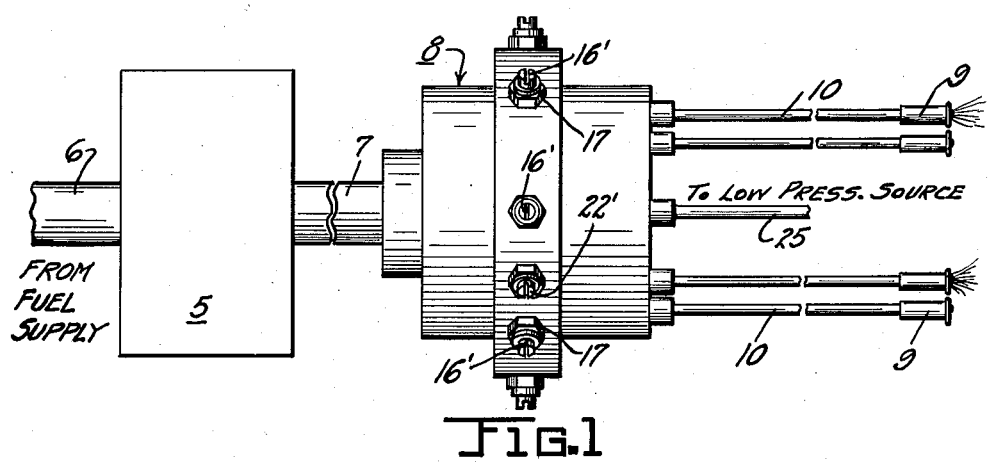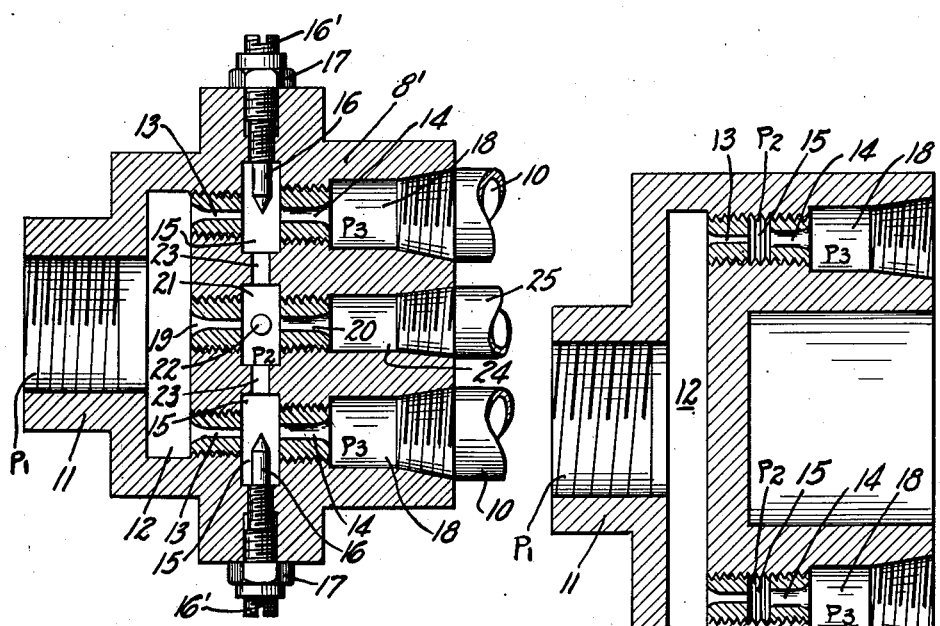

2,657,702

UNITED STATES PATENT OFFICE 2,657,702

FLOW DISTRIBUTOR

Charles O. Weisenbach, South Bend, Ind., assignor to Bendix Aviation Corporation, South Bend, Ind., a corporation of Delaware Application November 7, 1949, Serial No. 125,909

17 Claims. (Cl. 137—118)

1

This invention relates to fluid distributors or dividers for insuring an equal flow of fluid from a common source to a plurality of discharge points, for example, where liquid fuel under pressure is to be supplied to a plurality of discharge nozzles, as in a gas turbine engine.

An object of the invention is to provide a device of the type specified which has the marked advantage of simplicity in construction, yet will effectively function to maintain a predetermined flow to all discharge points irrespective of variations, within limits, of the discharge pressure at any one or more of said points.

Another object is to provide a flow divider or distributor which does not require a high degree of exactness in construction and initial flow calibration, but which is capable of adjustment during or after installation to obtain exact flow distribution.

Another object is to provide a flow divider which will effectively perform its intended function and which at the same time is devoid of any moving parts.

The foregoing and other objects and advantages will become apparent in view of the following description taken in conjunction with the drawing, wherein:

Figure 1 is a schematic view of a fuel supply system for a gas turbine engine incorporating a flow divider in accordance with the invention;

Figure 2 is a substantially central longitudinal section taken through the flow divider of Figure 1; and Figure 3 is a view similar to Figure 2 of a simplified form of the invention.

In Figure 1, fuel from a suitable source of supply, such as a pressure pump, not shown, flows to a fuel metering and control device 5 through conduit 6, and from said device the metered fuel flows by way of conduit 7 to the inlet side of the flow divider, which is generally indicated at 8. In the example illustrated in Figure 1, the flow divider distributes fuel to a plurality of discharge nozzles 9 through individual fuel lines 10. Any suitable type of fuel metering and control device may be used since it forms no part of the present invention. An example of a control device for gas turbine engines is disclosed in the copending application of Frank C. Mock, Serial No. 716,154 filed December 13, 1946.

Referring to Figure 2, the device comprises a suitable housing, indicated at 8', having a connecting portion 11 at its inlet side or end through which fuel flows to an equalizing chamber 12 and thence through sets of aligned orifices 13 and 14.

2

The orifices 14 are preferably larger than orifices 13 and the latter are each preferably calibrated to flow the same amount of fuel for a given head. These orifices 13 and 14 are axially spaced from one another to provide what may be termed a velocity head chamber 15 therebetween, into which projects a deflector member such as needle 16, which is shown as formed on the inner end of an adjustable screw 16' provided with a lock nut 17. The fuel or fluid leaving the orifices 14 flows through outlet chambers or passages 18 to the individual nozzle supply lines 10. The orifices 13 are preferably flared at their inlet ends to minimize losses due to friction and to contraction of the fluid streams, while the orifices 14 are preferably flared at their outlet ends to assist in converting the velocity head to pressure head as the streams flow through said orifices 14.

The central portion of the housing 8' is formed with an additional set of orifices 19 and 20 which may be shaped like the orifices 13 and 14 and axially aligned to provide a chamber 21 therebetween. An adjusting needle 22 projects into the chamber 21; it is formed on the inner end of a screw 22', Figure 1. The chambers 15 are vented to the chamber 21 through a series of radial passages 23. The orifice 20 discharges to a suitable low pressure source by way of chamber or passage 24 and connection 25, which source could be the low pressure side of the supply pump.

The additional orifices 19, 20 and commonly vented chamber 21 and deflector members 16 may, if desired, be dispensed with, as in Figure 3 where like parts are given corresponding reference numerals. This promotes simplicity, but results in a loss of adjustment and a more limited range of control, as will be explained in the brief description of operation which follows.

Operation

Fluid (in this case metered fuel) under pressure P1 enters the common inlet chamber 12 and flows through the smaller orifices 13 (also orifice 19 in Figure 2) and thence shoots across the chambers 15 (also chamber 21 in Figure 2) into and through the larger orifices 14 (also 20 in Figure 2). These individual streams of fuel produce a pumping or ejector action in the respective chambers 15 and 21. The flow through the smaller orifices 13 and 19 is dependent upon the pressure difference across these respective orifices, or the difference between P1 and P2 pressures. The pressure head is converted to velocity head in orifices 13 and 19 and passes through chambers 15 and 21 in a stream having primarily only velocity head. This high velocity stream enters orifices 14 and 20, where it is converted back to pressure head. The pumping or ejector action is due primarily to the flow of the fuel vapors in each of the chambers 15 into the low pressure area defined by each high velocity fuel stream and thence out through orifices 14. Beginning with the minimum P1 pressure which will effect an evacuation of the pressure in chambers 15, an incremental increase of P1 to some relatively high value will have a negligible effect on P2 for the reason that P2 can never decrease to a pressure less than the vapor pressure of the fluid flowing, and since a relatively low P1 pressure results in a P2 pressure which is substantially equal to the vapor pressure of the fuel flowing, higher P1 pressures will not effect a change in P2. Since the flow to each passage 18 and nozzles 9 is determined by the P1 minus P2 pressure difference, discharge of P3 pressure can be varied within very wide limits without affecting the flow. The flow may be selectively varied by adjusting the needles 16 to variably deflect the fuel into the chambers 15, which is in effect the same as subtracting a small amount of fuel from the established flow passing through orifices 13. It is, of course, desirable that the orifices 13 be calibrated to flow the same amount of fuel for given pressure drops.

Considering the form of the invention shown in Figures 1 and 2, the central or common chamber 21, being in communication with the chambers 15, permits a certain amount of fuel to be deflected from the chambers 15 into the chamber 21 and ejected to a lower pressure source through the orifice 20 and conduit 25. This common chamber 21 and its coacting input and discharge orifices may be calibrated so as to eject varying quantities of fuel from various chambers 15 for different adjustment settings of the deflector needles 16 in the various chambers. Over a predetermined range of adjustment the deflection of a portion of any given stream will have a negligible effect on the P2 pressure in the corresponding chamber so that fuel flow calibration may be effected without affecting the pressure difference, P1 minus P2, by deflector needle adjustment alone. Assuming in the system shown in Figure 1 that the flow divider is connected up to the respective discharge nozzles 9 and that the needles 16 have been adjusted to project slightly into the stream passing through said chambers, then, if upon a test run it is found that one of the fuel lines 10 is flowing more fuel than the remaining lines, the needle 16 of that particular flow system or conduit would be adjusted inwardly into the stream to thereby deflect a portion of the flow across the coacting chamber 15 to the chamber 21. By losing part of the flow passing through the orifices of that particular stream, the flow to the "off" nozzle would be reduced.

While in Figure 2 the needle 22 of the common or central chamber 21 may not be necessary or desired, yet it does serve the function of increasing or decreasing the ejector action in said chamber to thereby vary the P2 pressure in all of the chambers 15 in communication therewith.

In the simplified form shown in Figure 3, there is no means to adjust the flow, yet in this type of unit the same variation in discharge pressure is permitted at the discharge points or nozzles as in Figure 2 without upsetting or disturbing the P1—P2 differential which determines the flow through the orifices 13. Thus, if one of the nozzles should be completely blown out, leaving a free or unobstructed passage at the point of discharge, the flow of fuel to this particular nozzle would remain unchanged since the head which determines flow would also remain unchanged. If one of the nozzles should become obstructed or clogged, the flow to this particular nozzle would still remain unchanged so long as an excessive back pressure build-up did not occur to affect the P1—P2 differential across its coacting orifices 13.

Chambers 15 are interconnected in Figure 2 so that fuel deflected by members 16 will be ejected through radial passages 23, chamber 21, and orifice 20. Since no flow adjusting means is included in the embodiment shown in Figure 3 and equal nozzle flows are dependent on proper calibration of orifices 13, no interconnecting passage between the chambers 15 is necessary. Pressures P2 will be maintained constant throughout the range of fuel flow, at any given fuel temperature, since equal ejector action will exist in each of chambers 15, resulting in chamber pressures equal to the vapor pressure of the fluid flowing, as described hereinbefore, for any flow velocity therethrough which is above a predetermined minimum amount. When there is no flow to nozzles 9, chambers 12 and 15 are at the same pressure. When chamber 12 is first pressurized, equal pressure drops exist across orifices 13 resulting in equal flow velocities through chambers 15. For any change in metered fuel pressure to chamber 12 equal increments of change in chambers 15 flow velocities will occur across the accurately calibrated orifices 13 while pressures P2 remain constant, resulting in equal increments of change in the flow to each nozzle.

An important advantage in the flow divider disclosed herein is the fact that the orifices 13 in Figure 2 need not be formed or calibrated to an unusually high degree of exactness, which is usually required in flow dividers of other known types. This results from the fact that should the flow through that particular system of orifices be out of balance with respect to the remaining flow systems, it is only necessary to adjust the needle 16 to bring the system into balance. Another important advantage is that there is no chance of a large or dangerous amount of fuel being suddenly dumped into any one burner (assuming the system is being used in a gas turbine engine) due to complete blowout of the nozzle, since should this occur, the flow to that particular burner will never exceed the flow determined by the P1—P2 pressure across the orifices 13.

Although only two embodiments of the invention have been illustrated and described, various changes in form and relative arrangements of parts may be made to suit requirements.

I claim:

1. A device for dividing a stream of fluid under pressure into a plurality of individual streams, comprising a housing adapted to be interposed in the stream to be divided and having an input side and a discharge side and pairs of substantially axially aligned flow orifices connecting the input and discharge sides, there being a pair of orifices for each individual stream with the orifices of each pair spaced axially to provide a chamber therebetween, the orifices on the discharge side having an effective flow area at least as great as the effective flow area of the orifices on the input side.

2. A device as claimed in claim 1 plus means for adjusting the flow through said chambers.

3. A device for dividing a stream of fluid under pressure into a plurality of individual streams for delivery to points of discharge, comprising a housing adapted to be interposed in the stream to be divided and having an input passage and a plurality of discharge passages leading to said points of discharge, pairs of substantially axially aligned flow orifices connecting the input passage with said discharge passages, there being a pair of orifices for each discharge passage with the orifices of each pair spaced axially to provide a chamber therebetween, the orifices on the upstream side of said chambers which receive fluid from the input passage being restricted relatively to the orifices on the downstream side of said chambers, and an additional pair of similarly arranged orifices and coacting chamber through which fluid is ejected to a low pressure source, said latter chamber being commonly vented to said first-named chambers.

4. A device as claimed in claim 3 plus means for selectively and variably deflecting the fluid shooting at high velocity across said first named chambers into said commonly-vented chamber.

5. A device as claimed in claim 3 wherein there is a deflector member adjustably projecting into each of said first named chambers for variably deflecting the fluid shooting at high velocity across said chambers into said commonly vented chamber.

6. A device as claimed in claim 3 plus means for adjusting the flow through all of said chambers including the commonly vented chamber.

7. A device as claimed in claim 1 wherein the orifices on the discharge side are contoured to efficiently convert velocity head to pressure head.

8. A device as claimed in claim 1 wherein the orifices on the inlet side are contoured to produce a flow contraction factor close to unity.

9. A device as claimed in claim 1 wherein the orifices on the discharge side are flared toward their discharge ends to efficiently convert velocity head to pressure head.

10. A device as claimed in claim 1 wherein the orifices on the inlet side are flared at their inlet ends to minimize losses due to friction and contraction of the fluid streams.

11. A device for dividing a stream of fluid under pressure into a plurality of individual streams comprising a chamber having a fluid inlet port, and a plurality of fluid outlet passages, a restriction in each of said passages, a second restriction in each of said passages posteriorly spaced from said first mentioned restriction and having an effective flow area at least as great as the effective flow area of the first mentioned restriction.

12. A device as claimed in claim 11 plus means for adjusting the flow between said restrictions.

13. A device for dividing a stream of fluid under pressure into a plurality of individual streams comprising a chamber, a fluid inlet port for said chamber, a plurality of outlet passages for said chamber, a fluid return passage connected to said chamber, a restriction in each of said passages, a second restriction in each of said passages spaced from said first mentioned restriction on the downstream side thereof and having an effective flow area at least as great as the effective flow area of the first mentioned restrictions, and conduits connecting the space between the restriction in each of said outlet passages with the space between the restrictions in said fluid return passage.

14. A device as claimed in claim 13 plus means for selectively and variably deflecting the fluid shooting at high velocity between the restrictions in said outlet passages into the space between the restriction in said return passage.

15. A device as claimed in claim 13 plus means for adjusting the flow between the restrictions in all said passages.

16. In a fluid flow distributor, a plurality of fluid passageways, a first restriction in each of said passageways, a second restriction in each of said passageways, and a chamber formed between said first and second restrictions in each of said passageways, said first and second restriction and said chamber being so constructed and arranged in each of said passageways that a pumping action takes place in each of said chambers when fluid is flowing through said passageways.

17. In a fluid flow distributor, a plurality of fluid passageways, a first restriction in each of said passageways, a second restriction in each of said passageways, and a chamber formed between said first and second restrictions in each of said passageways, said first and second restrictions and said chamber being so constructed and arranged in each of said passageways that the flow of fluid therethrough maintains a substantially constant pressure in each of said chambers throughout the flow range of the distributor which is substantially equal to the vapor pressure of the fluid flowing.

CHARLES O. WEISENBACH.

References Cited in the file of this patent

UNITED STATES PATENTS

| Number | Name | Date |
| --- | --- | --- |
| 1,318,676 | Lawrence | Oct. 14, 1919 |
| 2,158,716 | Bergdoll | May 16, 1939 |